April 7, 1964 P. PIETSCH 3,127,777
MECHANICAL MOVEMENT FOR THE CONVERSION OF CONTINUOUS
MOTION INTO INTERMITTENT MOTION
Filed Aug. 22, 1961 3 Sheets-Sheet 1

PAUL PIETSCH
INVENTOR.

BY

April 7, 1964  P. PIETSCH  3,127,777
MECHANICAL MOVEMENT FOR THE CONVERSION OF CONTINUOUS
MOTION INTO INTERMITTENT MOTION
Filed Aug. 22, 1961  3 Sheets-Sheet 2

PAUL PIETSCH
INVENTOR.

BY *Mestern, Ross & Mestern*

April 7, 1964   P. PIETSCH   3,127,777
MECHANICAL MOVEMENT FOR THE CONVERSION OF CONTINUOUS
MOTION INTO INTERMITTENT MOTION
Filed Aug. 22, 1961   3 Sheets-Sheet 3

PAUL PIETSCH
*INVENTOR.*

BY *Mostern, Rose & Mostern*

United States Patent Office 3,127,777
Patented Apr. 7, 1964

3,127,777
MECHANICAL MOVEMENT FOR THE CONVERSION OF CONTINUOUS MOTION INTO INTERMITTENT MOTION
Paul Pietsch, Einbeck, Hannover, Germany, assignor to Arnold & Stolzenberg G.m.b.H., Einbeck, Hannover, Germany
Filed Aug. 22, 1961, Ser. No. 157,864
Claims priority, application Germany Aug. 22, 1960
14 Claims. (Cl. 74—84)

My present invention relates to a mechanical movement for the conversion of continuous motion into intermittent motion and, more particularly, to a mechanical movement for the conversion of continuous rotary motion into an intermittent rotary motion with mathematically precisely reproducible pauses.

In commonly assigned co-pending application Ser. No. 24,937, filed April 27, 1960 and now U.S. Patent No. 3,068,708, there is disclosed an intermittent chain-and-crank drive whose input member is rotatable with substantially constant angular velocity while the output member rotates intermittently with exactly reproducible pauses. The chain-and-crank drive disclosed in the aforementioned application comprises a fixed central sprocket wheel and a satellite sprocket wheel revolvable about the axis of the central sprocket wheel with substantially constant angular velocity; a flexible chain encircles the sprocket wheels and carries a pin which is articulated to one extremity of a crank arm whose other extremity is hinged to another crank arm swingable about the axis of the fixed sprocket wheel. As the satellite sprocket wheel is swung about the fixed axis of the central wheel, the chain pin, which remains substantially stationary while the portion of the chain carrying it is in contact with the periphery of the central wheel, is displaced along a curve approximating an involute until the pin again contacts the periphery of the central wheel. In the mechanical movement described in the commonly assigned co-pending application, the movement of the pin is translated, via the crank mechanism, into an angular output which is periodically interrupted for the duration of contact between the central wheel and the pin-carrying portion of the chain. While this mechanism has several important advantages in that it is able to obviate undesirable variations in the pause duration resulting from wear of erstwhile cam-and-follower mechanisms and Geneva-type timing devices, it has the disadvantage that the angular velocity of the output member between pauses reaches two peaks and falls off between the peaks, i.e. at an intermediate point in the travel of the output member. This deceleration of the output member is particularly disadvantageous in applications wherein a smooth movement between pauses is essential.

It is, therefore, an object of the instant invention to provide a mechanical movement of the character described adapted to translate a continuous rotary motion into an intermittent rotation of a member whose angular velocity varies smoothly between pauses.

A further object of the invention is to provide a mechanical movement having an intermittent output with reproducibly precise and readily adjustable pause durations.

The above objects are realized, in accordance with the invention, in a mechanical movement comprising a central body having a closed peripheral surface lying in a plane, a satellite swingable about the central body in this plane, and a closed flexible member which encircles the satellite and the central body, preferably in positive engagement therewith, and has a portion constrained to slide in a guide body, one of these bodies being coupled to a load for operating it with intermittent motion upon the continuous swinging of the satellite about the central body, the other body being held substantially stationary.

According to a more particular feature of the invention, the guide body is swingable about the axis of the central body, which is held stationary, while being coupled to a load so that substantially only the angular component of the involute motion of the constrained portion of the flexible member is communicated to the load. To this end the guide body is designed so that the portion of the flexible member engaging it is free to move radially while its angular displacement entrains the guide body therewith. The guide body is, advantageously, formed with a slot extending radially in the direction of the axis of the central body and engaging a pin carried by the flexible member. While the latter may comprise a flexible, substantially inextensible band in frictional engagement with the central body, the flexible endless member preferably is constituted by a chain or the like positively engaging the central member. Thus the latter may be a sprocket wheel in mesh with the chain whereas the satellite may be a similar sprocket wheel rotatably journaled on its support arm which is, in turn, swingably journaled coaxially with the central sprocket wheel. Alternatively, the satellite may include a curved surface over which the flexible member passes in sliding contact as the support arm for the satellite is swung about the axis of the central body.

According to a further feature of the invention, the aforementioned guide body is held stationary in which case the central body is journaled for rotation about its axis so that the load may be coupled directly with the intermittently rotating central body. Moreover, while the use of a rotating guide body having a radial guide slot eliminates any effect of the radial component of the motion of the chain pin on the output angular velocity, thereby obviating undesirable deceleration of this velocity during the active or working portion of the mechanism cycle, it may be desirable in certain applications to introduce a radial component of the pin movement in the output angular velocity. In this case the guide slot may be suitably curved or may extend skew to the radial direction. Since the relative durations of the active or duty phase of the mechanism cycle and the passive or pause phase thereof are proportional to the arc along the periphery of the central body subtended by the involute (i.e. the angle swept by the satellite during the involute motion of the pin) and the angle swept by the satellite while the pin remains stationary at the periphery of the central body, it is possible, in accordance with the invention, to vary the angle over which the pin remains stationary and substantially in contact with the periphery of the central body by adjusting the relative radii of the satellite and central bodies or by adjusting the angle of contact with the aid of one or more idler wheels.

The above and other objects, features and advantages of the instant invention will become more readily apparent from the following description, reference being made to the accompanying drawing in which.

Figure 2:
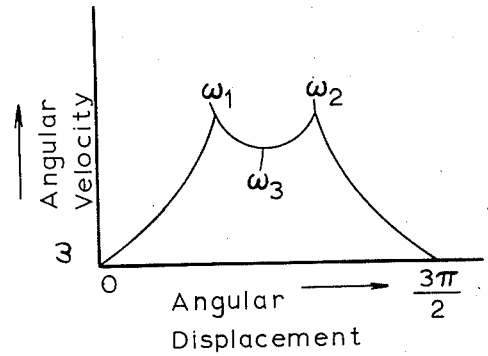
FIG. 2 is a graph illustrative of the operation of this mechanism.
Figure 1:
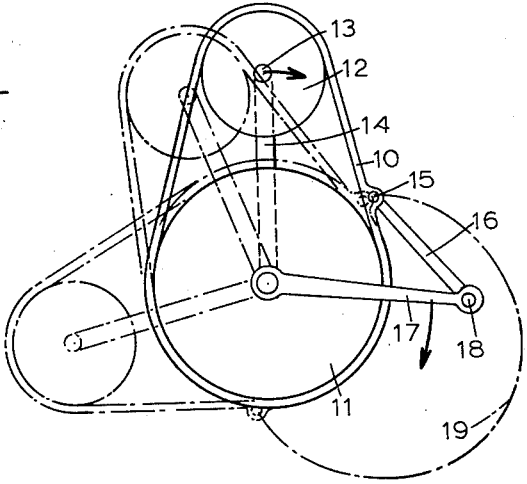
FIG. 1 is a schematic illustration of a chain-and-crank mechanism of the type disclosed in the aforementioned co-pending application.

FIG. 1 illustrates a chain-and-crank mechanism wherein a chain 10 encircles a stationary central sprocket wheel 11 and a satellite wheel 12, the latter being journaled at 13 to a support arm 14. The chain 10 carries a pin 15 to which one limb 16 of a crank linkage 16, 17 is pivoted. The other limb 17 is articulated at 18 to limb 16 and journaled for rotation about the axis of central wheel 11. The satellite-support arm 14 is also journaled for rotation about this axis. Upon clockwise rotation of the support arm 14, which constitutes the input member of the mechanism, chain 10 is unrolled from the central or sun wheel 11 so that the pin 15 describes a path 19, approaching an involute, thereby swinging crank limb 17 in the clockwise direction until the portion of chain 10 carrying the pin 15 again contacts the surface of the wheel 11. Since the movement of pin 15 along its involute path includes both a radial component and an angular component, the angular velocity of the limb 17 during the active phase of the operation of the mechanism is a resultant of these two components modified by the crank 16, 17. A plot of the angular velocity $\omega$ of the limb 17, which constitutes the output member of the mechanism, against the angle swept by the satellite-support arm 14 is shown in FIG. 2 whence it can be seen that the velocity of crank 17 reaches spaced peaks $\omega_1$ and $\omega_2$ bracketing a trough $\omega_3$.

The mechanical movements illustrated in the succeeding figures obviate, in accordance with my invention, the disadvantageous deceleration of the output velocity during the active phase of the operation of the mechanism.

Figure 3:
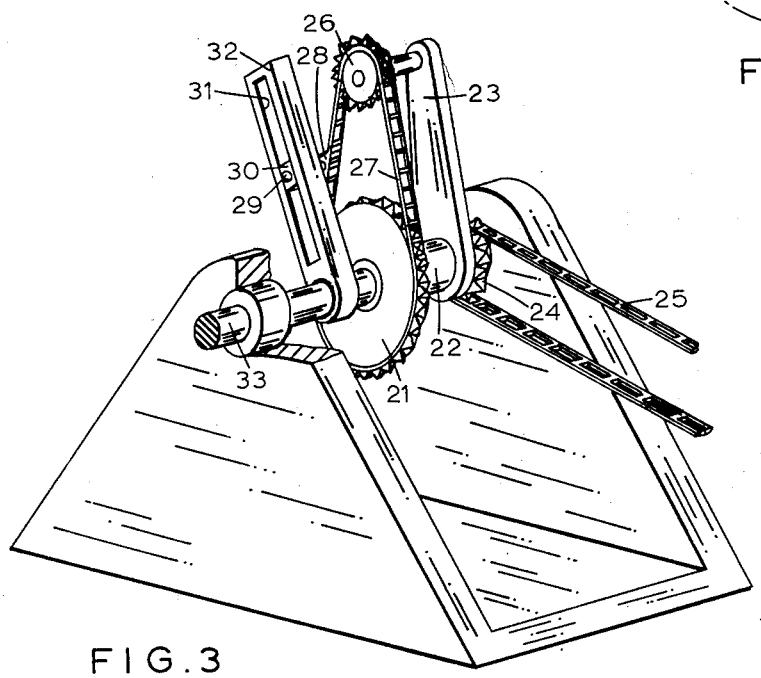
FIG. 3 is a perspective view, partly broken away, of a mechanical movement according to the instant invention.

In FIG. 3 I show a mechanism adapted to translate a rotary input into an intermittent rotary output and comprising a support 20 carrying a central sprocket wheel 21 whose shaft 22 is rigid with the support. The shaft 22 also carries a swingable arm 23 to which is affixed a drive sprocket wheel 24 rotated by a chain 25 with substantially constant speed. A satellite sprocket wheel 26 is journaled to the arm 23 and engages a chain 27, one of whose links 28 is provided with a pin 29 projecting parallel to the axis of sprocket wheel 21, encircling the satellite and central wheels 26 and 21. Pin 29 is rotatably received in a block 30 which slides in a radially extending channel 31 formed in a guide body 32. The latter is rigidly fixed to an output shaft 33 which is journaled in the support 20 and in the shaft 22 coaxially therewith. Shaft 33 may be connected in the usual manner to a load.

Figure 5:
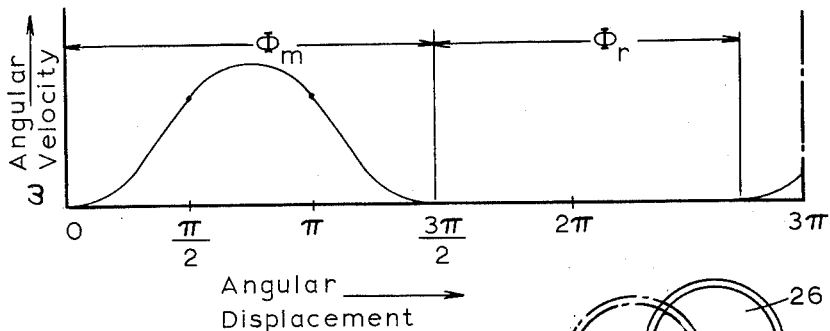
FIG. 5 is a graph illustrative of the operation of the mechanical movement of FIGS. 3 and 4.
Figure 4:
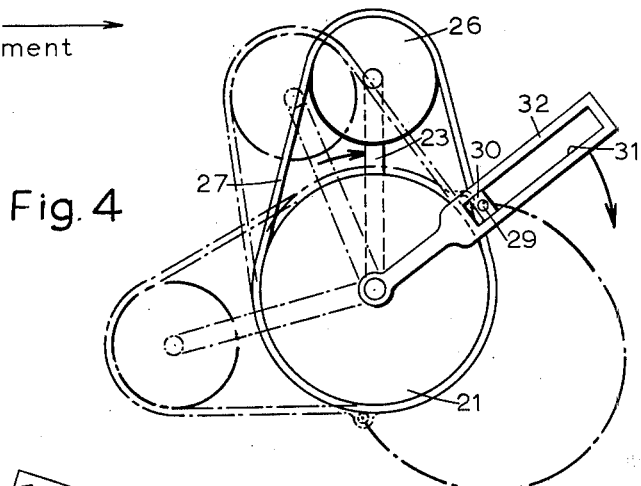
FIG. 4 is a diagrammatic view similar to FIG. 1 of the mechanism of FIG. 3.

In FIG. 4 there is shown a diagrammatic view of the mechanism of FIG. 3 which is provided to facilitate the understanding of its operation. As the satellite-support arm 23 is rotated counterclockwise with, preferably, constant angular velocity, the pin 29 carried by chain 27 describes a path approaching an involute. Since the pin 29 is free to move radially in the guide body 32, only the angular component of its motion is imparted to this guide 32 and thence to the output shaft 33. The angular velocity of this shaft then follows the smooth curve shown in FIG. 5. The relative duration of the active and passive phases of the mechanism are, of course, proportional respectively to the angle $\phi_m$ swept by the support arm 23 during the involute movement of pin 29 and to the angle $\phi_r$ swept by the arm while the pin 29 is in its rest position along the periphery of the central wheel 21. It is thus possible to define the duty cycle of the mechanism or the ratio of the duration of the active and passive phases by the relationship $$m = \frac{\phi_m}{\phi_r}$$

Figure 6:
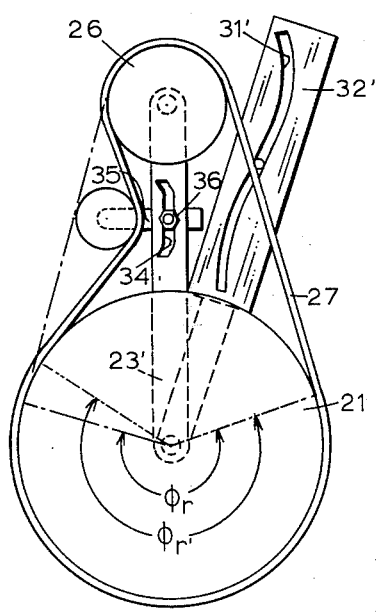
FIG. 6 is a view similar to FIG. 4 of a mechanical movement according to a further embodiment of the invention.

FIG. 6 illustrates an embodiment of the invention generally similar to that of FIG. 4 wherein, however, the duty cycle may be adjusted. To this end the satellite-support arm 23' is formed with a slot 34 along which a bar 35 is slidably adjustable, a locking screw 36 being provided to secure the bar in a predetermined position. Bar 35 carries an idler sprocket 37 engageable with the chain 27 and adapted to deflect it in order to alter the angle over which it subtends the central wheel 21. Normally, the chain 27 encircles the wheels 26 and 21 without deflection as indicated in dot-dash lines so that the rest or pause angle $\phi_r$ is equal to the arc of the central-wheel periphery normally subtended by the chain. When, however, the idler 37 deflects the chain as illustrated in solid lines, a new pause angle $\phi_r'$ is obtained. Thus the duty cycle $m$ may be readily altered merely by adjustment of the idler 36 along the support 23'. Whereas the guide body 32 of FIG. 4 is formed with a straight radially extending guide slot 31, the slot 31' in body 32' of FIG. 6 is an S-shaped curve so that the output velocity of the latter mechanism will have a minor contribution from the radial component of the displacement of pin 29. Slot 34 is so shaped that the tension of chain 27 remains substantially constant in all positions of adjustment of idler 37.

Figure 7:
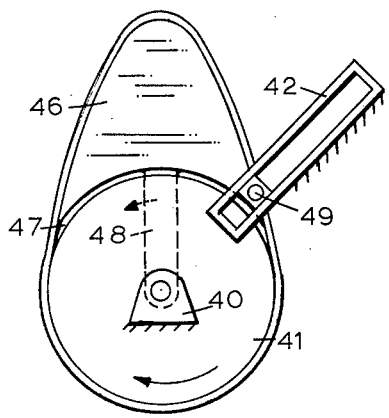
FIG. 7 is a view of a mechanical movement constituting a kinematic reversal of the embodiment of FIG. 4.

In FIG. 7 I show a kinematic reversal of the mechanism illustrated in FIG. 4. In the instant embodiment a satellite body 46, having a curved surface along which the flexible member 47 passes, is carried by a swingable arm 48, which is driven by suitable means of the type described with reference to FIG. 3, while the central wheel 41 is journaled for rotation in a housing not further illustrated. The pin 49 of the flexible member 47 is guided radially in a fixed guide body 42 so that upon swinging of the satellite body 46, to displace the pin 49 out of its rest position along the periphery of wheel 41, the latter is rotated to transmit intermittent rotary motion to a load not shown. When the pin 49 lies along the periphery of the central member it remains, of course, stationary.

Figure 9:
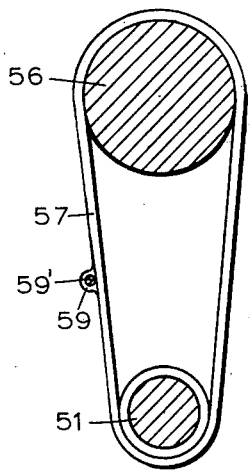
FIG. 9 is a cross-sectional view taken along line IX—IX of FIG. 8.
Figure 8:
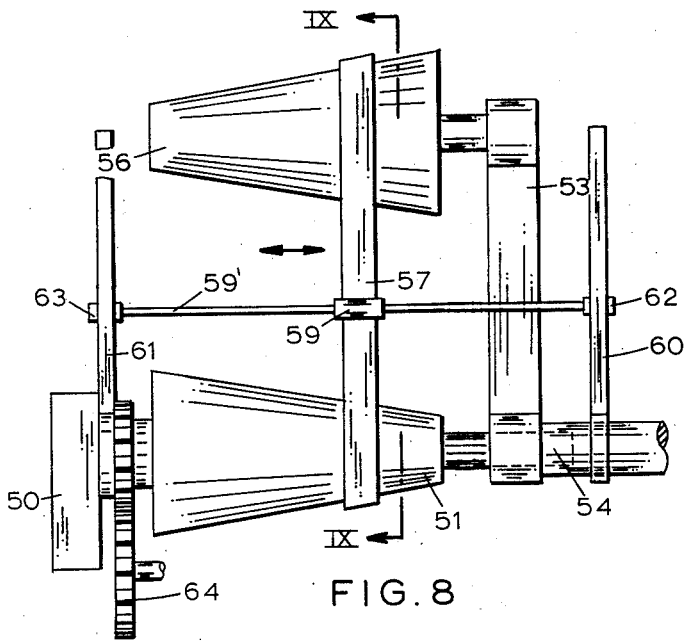
FIG. 8 is an elevational view of a mechanism of adjustable pause duration, according to the invention.

The embodiment illustrated in FIGS. 8 and 9 renders it possible to alter the duty cycle of a mechanical movement, according to the invention, during its operation. The mechanism comprises a central conical pulley 51, which is fixed to a support 50, frictionally engaged by a belt 57 carrying a sleeve 59. The belt also passes over an inversely conical pulley 56 journaled on a support arm 53, the latter being fixed to an input shaft 54 rotatable coaxially with the stationary pulley 51. An axially extending rod 59', slidably and rotatably received in the sleeve 59, is supported by two blocks 62, 63 radially shiftable in respective guide bodies 60, 61. The latter are angularly displaceable relatively to the fixed pulley 51 and are connected to a load (not shown) via a gear transmission 64. The instant mechanism operates similarly to the mechanical movement shown in FIG. 4 with the exception that the duty cycle may be adjusted by manually shifting the belt 57 in axial direction along the pulleys 51, 56 to alter the effective radii of the satellite and central bodies, thereby varying the peripheral angle of the stationary pulley 51 subtended by the belt 57. It should be noted, however, that the construction illustrated in FIGS. 8 and 9 is satisfactory only for small loads (e.g. for timing applications) since no provision has been made for a positive engagement of the belt by the central pulley.

Figure 10:
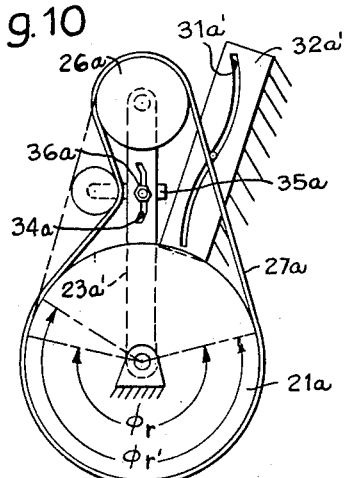
FIG. 10 is a view generally similar to FIG. 6 but illustrating a kinematic reversal of the system thereof.

FIG. 10 illustrates a mechanism which is structurally similar to that of FIG. 6 with adjustable duty cycle but having the kinematic arrangement of FIG. 7. The mechanism comprises a rotatable satellite-support arm 23a formed with a slot 34a along which the bar 35a is slidably adjustable, a locking screw 36a being provided to secure the bar in a predetermined position. Bar 35a carries an idler sprocket 37a engageable with the chain 27a and adapted to deflect it in order to alter the angle over which it subtends the rotatable central wheel 21a. The chain passes over the central wheel 21a and the satellite wheel 26a while having a pin guided in the slot 31a of a fixed guide body 32a'. The pause duration is altered as described with reference to FIG. 6 while the system functions similarly to that of FIG. 7, the central wheel 21a being coupled with the load.

The invention as described and illustrated is believed to admit of many modifications and variations readily apparent to persons skilled in the art and intended to be included within the spirit and scope of the invention as claimed.

I claim:

1. A mechanical movement comprising a central body having a closed peripheral surface lying in a plane and surrounding an axis transverse to said plane, a satellite swingable about said central body in said plane, a closed flexible member encircling said satellite and said central body in peripheral engagement therewith, and a guide body slidably engaging a portion of said flexible member, one of said bodies being coupled to a load for operating it with intermittent motion upon a swinging of said satellite about said axis, the other of said bodies being fixed against displacement.

2. A mechanical movement according to claim 1 wherein said central body and said flexible member are provided with complementary means limiting slippage between said control body and said member.

3. A mechanical movement according to claim 2 wherein said peripheral surface is concentric with said axis.

4. A mechanical movement according to claim 3 wherein said central body is a sprocket wheel and said flexible member is a chain positively engaging said sprocket wheel.

5. A mechanical movement according to claim 4 wherein said satellite is another sprocket wheel, further comprising support means swingable about said axis, said other sprocket wheel being journaled to said support means at a location offset from said axis.

6. A mechanical movement according to claim 5, further comprising drive means for swinging said support means about said axis with substantially constant angular velocity.

7. A mechanical movement comprising a fixed central body having a closed peripheral surface lying in a plane and surrounding an axis transverse to said plane, a satellite swingable about said central body in said plane, a closed flexible member encircling said satellite and said central body in peripheral engagement therewith, and a guide body swingable about said axis and slidably engaging a portion of said flexible member, said guide body being coupled to a load for operating it with intermittent motion upon a swinging of said satellite about said axis.

8. A mechanical movement according to claim 7 where said guide body is provided with an elongated guide slot, said flexible member having a pin slidable in said slot.

9. A mechanical movement according to claim 8 wherein said guide slot is substantially straight and extends radially.

10. A mechanical movement according to claim 8 wherein said guide slot is curved.

11. A mechanical movement comprising a rotatable central body having a closed peripheral surface lying in a plane and surrounding an axis transverse to said plane, a satellite swingable about said central body in said plane, a closed flexible member encircling said satellite and said central body in peripheral engagement therewith, and a fixed guide body slidably engaging a portion of said flexible member, said central body being coupled to a load for operating it with intermittent motion upon a swinging of said satellite about said axis.

12. A mechanical movement comprising a central body having a closed peripheral surface lying in a plane and surrounding an axis transverse to said plane, a satellite swingable about said central body in said plane, a closed flexible member encircling said satellite and said central body in peripheral engagement therewith, and a guide body slidably engaging a portion of said flexible member, one of said bodies being coupled to a load for operating it with intermittent motion upon a swinging of said satellite about said axis, the other of said bodies being fixed against displacement, and control means for adjusting the arc of said surface subtended by said flexible member.

13. A mechanical movement comprising a fixed central body having a closed peripheral surface lying in a plane and surrounding an axis transverse to said plane, a satellite swingable about said central body in said plane, a closed flexible member encircling said satellite and said central body in peripheral engagement therewith, and a guide body swingable about said axis and slidably engaging a portion of said flexible member, said guide body being coupled to a load for operating it with intermittent motion upon a swinging of said satellite about said axis, and control means for adjusting the arc of said surface subtended by said flexible member.

14. A mechanical movement comprising a rotatable central body having a closed peripheral surface lying in a plane and surrounding an axis transverse to said plane, a satellite swingable about said central body in said plane, a closed flexible member encircling said satellite and said central body in peripheral engagement therewith, and a fixed guide body slidably engaging a portion of said flexible member, said central body being coupled to a load for operating it with intermittent motion upon a swinging of said satellite about said axis, and control means for adjusting the arc of said surface subtended by said flexible member.

References Cited in the file of this patent

UNITED STATES PATENTS

| | | |
|---|---|---|
| 2,861,672 | Buhrer et al. | Nov. 25, 1958 |
| 3,068,708 | Hain | Dec. 18, 1962 |